United States Patent
Zitnick, III (10) Patent No.: US 8,538,164 B2
(45) Date of Patent: Sep. 17, 2013

(54) IMAGE PATCH DESCRIPTORS

(75) Inventor: Charles Lawrence Zitnick, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 12/910,868

(22) Filed: Oct. 25, 2010

(65) Prior Publication Data

US 2012/0099796 A1 Apr. 26, 2012

(51) Int. Cl.
*G06K 9/36* (2006.01)
*G06K 9/48* (2006.01)

(52) U.S. Cl.
USPC .......................................... 382/199; 382/232

(58) Field of Classification Search
None
See application file for complete search history.

(56) References Cited

U.S. PATENT DOCUMENTS 6,275,614 B1 8/2001 Krishnamurthy et al.
7,023,441 B2 * 4/2006 Choi et al. .................... 345/441

FOREIGN PATENT DOCUMENTS

WO 2010013237 A1 2/2010

OTHER PUBLICATIONS

Reference Type: Journal Article Author: Lowe, David G. Primary Title: Distinctive Image Features from Scale-Invariant Keypoints Journal Name: International Journal of Computer Vision Cover Date: Nov. 1, 2004 Publisher: Springer Netherlands Issn: 0920-5691 Subject: Computer Start p. 91 End p. 110 vol. 60 Issue: 2 Url: http://dx.doi.or.*

Dalai, N.; Triggs, B.; , "Histograms of oriented gradients for human detection," Computer Vision and Pattern Recognition, 2005. CVPR 2005. IEEE Computer Society Conference on , vol. 1, no., pp. 886-893 vol. 1, Jun. 25-25, 2005 doi: 10.1109/CVPR.2005.177 URL: http://ieeexplore.ieee.org/stamp/stamp.jsp?tp=&arnumber=1467360&isnumber=31472.*
Babenko, B.; Dollar, P.; Belongie, S.; , "Task Specific Local Region Matching," Computer Vision, 2007. ICCV 2007. IEEE 11th International Conference on , vol., no., pp. 1-8, Oct. 14-21, 2007 doi: 10.1109/ICCV.2007.4408848 URL: http://ieeexplore.ieee.org/stamp/stamp.jsp?tp=&arnumber=4408848&isnumber=4408819.*
Shape recognition with edge-based features Krystian Mikolajczyk 1, Andrew Zisserman () a, 1, Cordelia Schmid () 2 British Machine Vision Conference (BMVC '03) 2 (2003) 779-788.*
Takacs, et al., "Permutable Descriptors for Orientation-Invariant Image Matching", Retrieved at << http://www.stanford.edu/~gtakacs/papers/riffpolar.pdf >>, Sep. 7, 2010, pp. 1-8.
Winder, Simon A. J., "Pipelines for Image Matching and Recognition", Retrieved at << http://research.microsoft.com/en-us/people/swinder/matchingintro.pdf >>, Feb. 2010, pp. 1-7.

(Continued)

*Primary Examiner* — Stephen R Koziol
*Assistant Examiner* — Amandeep Saini
(74) *Attorney, Agent, or Firm* — Medley, Behrens & Lewis, LLC (57) ABSTRACT

Described herein are various technologies for generating descriptors for image patches. An image patch can be received, and gradients of pixels in the image patch can be determined. The gradients are normalized based upon an average magnitude of the gradients in a local spatial region with respect to a given pixel under consideration. A four-dimensional histogram is defined that takes into consideration pixel orientation, and normalized gradients are selectively assigned to bins of the histogram. The bins are binarized as a function of a number of gradients assigned thereto, and the binarized bins can be utilized as a descriptor for the image patch.

20 Claims, 8 Drawing Sheets (56) References Cited

OTHER PUBLICATIONS

Juan, et al., "A Comparison of SIFT, PCA-SIFT and SURF", Retrieved at << http://www.cscjournals.org/csc/manuscript/Journals/IJIP/volume3/Issue4/IJIP-51.pdf >>, International Journal of Image Processing (IJIP), vol. 3, No. 4, Oct. 21, 2009, pp. 143-152.
Wang, et al., "Efficient Topological Localization Using Orientation Adjacency Coherence Histograms", Retrieved at << http://ieeexplore.ieee.org/stamp/stamp.jsp?arnumber=01699199 >>, Proceedings of the 18th International Conference on Pattern Recognition, vol. 02, Aug. 20-24, 2006, pp. 1-4.
Roth, et al., "An Image Search System for UAVs", Retrieved at << http://citeseerx.ist.psu.edu/viewdoc/download?doi=10.1.1.127.7915&rep=rep1&type=pdf >>, Nov. 16-18, 2005, pp. 1-11.
Lowe, David G., "Distinctive Image Features from Scale-Invariant Keypoints", Retrieved at << http://www.springerlink.com/content/h4l02691327px768/fulltext.pdf >>, International Journal of Computer Vision, vol. 60, No. 22, Nov. 2004, pp. 91-110.
Nister, et al., "Scalable Recognition with a Vocabulary Tree", Retrieved at << http://www.vis.uky.edu/~stewe/publications/nister_stewenius_cvpr2006.pdf >>, CVPR, Proceedings of the 2006 IEEE Computer Society Conference on Computer Vision and Pattern Recognition, vol. 2, Jun. 17-22, 2006, pp. 1-16.
Rothganger, et al., "3D Object Modeling and Recognition Using Local Affine-Invariant Image Descriptors and Multi-View Spatial Constraints", Retrieved at << http://citeseerx.ist.psu.edu/viewdoc/download?doi=10.1.1.117.1687&rep=rep1&type=pdf >>, International Journal of Computer Vision, vol. 66, No. 3, Mar. 2006, pp. 231-259.
Snavely, et al., "Photo Tourism: Exploring Photo Collections in 3D", Retrieved at << http://citeseerx.ist.psu.edu/viewdoc/download?doi=10.1.1.62.910&rep=rep1&type=pdf >>, International Conference on Computer Graphics and Interactive Techniques, ACM SIGGRAPH 2006 Papers, Jul. 30-Aug. 3, 2006, pp. 1-12.
Fergus, et al., "Object Class Recognition by Unsupervised Scale-Invariant Learning", Retrieved at << http://citeseerx.ist.psu.edu/viewdoc/download?doi=10.1.1.114.7863&rep=rep1&type=pdf >>, In Computer Vision and Pattern Recognition, 2003. Proceedings. 2003 IEEE Computer Society Conference on, vol. 2, 2003, pp. II-264-II-271.
Crandall, et al., "Weakly Supervised Learning of Part-Based Spatial Models for Visual Object Recognition", Retrieved at << http://www.cs.cornell.edu/~dph/papers/eccv06-unsup.pdf >>, Computer Vision—ECCV 2006 In Proc. of European Conf. on Computer Vision (ECCV), 2006, pp. 1-14.
Felzenszwalb, et al., "A Discriminatively Trained, Multiscale, Deformable Part Model", Retrieved at << http://people.cs.uchicago.edu/~pff/papers/latent.pdf >>, In IEEE International Conference on Computer Vision and Pattern Recognition (CVPR) Anchorage, Alaska, Jun. 2008, pp. 1-8.
Berg, et al., "Geometric Blur for Template Matching", Retrieved at << http://citeseerx.ist.psu.edu/viewdoc/download?doi=10.1.1.25.5471&rep=rep1&type=pdf >>, In Computer Vision and Pattern Recognition, 2001. CVPR 2001. Proceedings of the 2001 IEEE Computer Society Conference on, vol. 1, 2001, pp. 1-8.
Mikolajczyk, et al., "A Performance Evaluation of Local Descriptors", Retrieved at << http://lear.inrialpes.fr/pubs/2005/MS05/mikolajczyk_pami05.pdf >>, IEEE Transactions on Pattern Analysis and Machine Intelligence, vol. 27, No. 10, Oct. 2005, pp. 1-34.
Winder, et al., "Learning Local Image Descriptors", Retrieved at << http://citeseerx.ist.psu.edu/viewdoc/download?doi=10.1.1.86.8259&rep=rep1&type=pdf >>, In Computer Vision and Pattern Recognition, 2007, CVPR '07. IEEE Conference on, 2007, pp. 1-16.
Winder, et al., "Picking the Best Daisy", Retrieved at << http://research.microsoft.com/pubs/79807/winder_hua_brown_cvpr09.pdf >>, Computer Vision and Pattern Recognition, IEEE Computer Society Conference on, vol. 0, 2009, pp. 1-8.
Dalal, et al., "Histograms of Oriented Gradients for Human Detection", Retrieved at << http://citeseerx.ist.psu.edu/viewdoc/download?doi=10.1.1.101.8745&rep=rep1&type=pdf >>, Proceedings of the 2005 IEEE Computer Society Conference on Computer Vision and Pattern Recognition (CVPR'05), vol. 1, 2005, pp. 1-8.
Ke, et al., "PCA-SIFT: A More Distinctive Representation for Local Image Descriptors", Retrieved at << http://citeseerx.ist.psu.edu/viewdoc/download?doi=10.1.1.6.2670&rep=rep1&type=pdf >>, 2004, pp. 1-8.
Tola, et al., "A Fast Local Descriptor for Dense Matching", Retrieved at << http://cvlab.epfl.ch/publications/publications/2008/TolaLF08.pdf >>, In Proceedings of IEEE Conference on Computer Vision and Pattern Recognition 2008, pp. 1-16.
Bay, et al., "Surf: Speeded Up Robust Features", Retrieved at << http://www.vision.ee.ethz.ch/~surf/eccv06.pdf >>, In 9th European Conference on Computer Vision, 2006, pp. 1-28.
Osindero, et al., "Modeling Image Patches with a Directed Hierarchy of Markov Random Fields", Retrieved at << http://citeseerx.ist.psu.edu/viewdoc/download?doi=10.1.1.83.3025&rep=rep1&type=pdf >>, 2008, pp. 1-8.
Lepetit, et al., "Keypoint Recognition using Randomized Trees", Retrieved at << http://citeseerx.ist.psu.edu/viewdoc/download?doi=10.1.1.83.3970&rep=rep1&type=pdf >>, Pattern Analysis and Machine Intelligence, IEEE Transactions, vol. 28, No. 9, Sep. 2006, pp. 1-27.
Shotton, et al., "Semantic Texton Forests for Image Categorization and Segmentation", Retrieved at << http://citeseerx.ist.psu.edu/viewdoc/download?doi=10.1.1.145.3036&rep=rep1&type=pdf >>, Computer Vision and Pattern Recognition, 2008. CVPR 2008. IEEE Conference, Jun. 23-28, 2008, pp. 1-8.
Babenko, et al., "Task Specific Local Region Matching", Retrieved at << http://citeseerx.ist.psu.edu/viewdoc/download?doi=10.1.1.88.6590&rep=rep1&type=pdf >>, Computer Vision, 2007. ICCV 2007. IEEE 11th International Conference, Oct. 14-21, 2007, pp. 1-8.
Torralba, et al., "Small Codes and Large Databases for Object Recognition", Retrieved at << http://ieeexplore.ieee.org/stamp/stamp.jsp?arnumber=04587633 >>, Computer Vision and Pattern Recognition, 2008. CVPR 2008. IEEE Conference, Jun. 23-28, 2008, pp. 1-8.
Salakhutdinov, et al., "Semantic Hashing", Retrieved at << http://www.cs.toronto.edu/~rsalakhu/papers/semantic_final.pdf >>, Jul. 2007, pp. 1-8.
Raginsky, et al., "Locality-Sensitive Binary Codes from Shift-Invariant Kernels", Retrieved at << http://people.ee.duke.edu/~maxim/pubs/raginsky_lazebnik_NIPS09.pdf >>, Dec. 8, 2009, pp. 1-9.
Broder, Andrei Z., "On the Resemblance and Containment of Documents", Retrieved at << http://citeseerx.ist.psu.edu/viewdoc/download?doi=10.1.1.24.779&rep=rep1&type=pdf >>, Compression and Complexity of Sequences 1997. Proceedings, Jun. 11-13, 1997, pp. 1-9.
Chum, et al., "Near Duplicate Image Detection: min-Hash and tf-idf Weighting", Retrieved at << http://citeseerx.ist.psu.edu/viewdoc/download?doi=10.1.1.142.2250&rep=rep1&type=pdf >>, pp. 1-20.
Chum, et al., "Geometric min-Hashing: Finding a (Thick) Needle in a Haystack", Retrieved at << http://cmp.felk.cvut.cz/~chum/papers/chum09cvpr.pdf >>, 2009, pp. 1-8.
Kulis, et al., "Kernelized Locality-Sensitive Hashing for Scalable Image Search", Retrieved at << http://userweb.cs.utexas.edu/~grauman/papers/iccv2009_klsh.pdf >>, Computer Vision, 2009 IEEE 12th International Conference on, Sep. 29-Oct. 2, 2009, pp. 1-8.
Silpa-Anan, et al., "Optimised KD-Trees for Fast Image Descriptor Matching", Retrieved at << http://mplab.ucsd.edu/wp-content/uploads/CVPR2008/Conference/data/papers/298.pdf >>, Computer Vision and Pattern Recognition, 2008. CVPR 2008. IEEE Conference on, Jun. 23-28, 2008, pp. 1-8.
Griffin, et al., "Caltech-256 Object Category Dataset", Retrieved at << http://authors.library.caltech.edu/7694/1/CNS-TR-2007-001.pdf >>, 2007, pp. 1-20.
Mikolajczyk, et al., "Shape Recognition with Edge-Based Features", Retrieved at << http://www.robots.ox.ac.uk/~vgg/publications/papers/mikolajczyk03a.pdf >>, Proceedings of the British Machine Vision Conference, 2003, pp. 1-10.

\* cited by examiner

IMAGE PATCH DESCRIPTORS

BACKGROUND

Computer-based systems have been developed to locate or recognize certain objects in digital images. For instance, applications have been developed that receive an image captured from a hand-held device, recognize one or more objects in such image, and then output information pertaining to the recognized object. In a specific example, an individual can utilize a camera on a mobile telephone to capture an image of a landmark, can upload the image of the landmark to a server, and the server can include an object recognition system that recognizes the landmark in the image. The server can then transmit information pertaining to the landmark back to the mobile telephone of the individual.

Generally, object recognition systems recognize objects by extracting image patches from a first image, generating descriptors for the image patches, and then comparing those descriptors with descriptors from a second image that include a known object. If there is sufficient similarity between descriptors of the first image and the second image, then it can be ascertained (with a certain probability) that the first image and the second image include a substantially similar object.

If the first image and the second image were identical, such that the images were taken in identical lighting from identical angles and at identical distances from an object, then object recognition would be relatively trivial. In real-world applications, however, no two images are the same. That is, between images of a substantially similar object, many factors pertaining to the object in the image can change, including position of the object across images, distance from the camera to the object across images, ambient light can alter with respect to when two images were generated, and/or an object can change over time. Accordingly, it is desirable to generate descriptors that are robust with respect to these variables across images.

Many approaches exist for selecting image patches and generating descriptors for image patches. These approaches include the use of Histograms of Gradients (HoG), which is defined as the histogram of image gradients over a combination of positions, orientations, and scales. While HoG has shown to be an effective mechanism for describing image patches, descriptors generated by such approach are somewhat variant with respect to image illumination and position of an object in an image.

SUMMARY

The following is a brief summary of subject matter that is described in greater detail herein. This summary is not intended to be limiting as to the scope of the claims.

Described herein are various technologies pertaining to object recognition in images. More specifically, described herein are various technologies pertaining to generating descriptors for image patches that are relatively invariant with respect to illumination, position of an object in an image, and intercategory variation.

To generate a descriptor for an image patch, an image can be received and an image patch can be extracted therefrom. The image patch may be an m×n patch of pixels, where m may be equal to n or not equal to n. The image patch can be selectively extracted from the image based upon interest point detection or may be extracted from the image based upon any other suitable technique.

Once the image patch has been extracted from the image, gradients pertaining to pixels in the image patch can be computed, wherein a gradient is a difference in pixel intensity values between adjacent pixels. Once the gradients are computed, magnitudes of the gradients therein can be normalized, thereby maintaining gradient profiles while removing relative height differences between peaks in the gradients. Further, such normalization can be undertaken based at least in part upon the average gradient magnitude in a local spatial neighborhood, rather than a global average of gradient magnitude. This normalization results in a plurality of normalized gradients.

Subsequent to the normalized being computed, edges can be detected by analyzing the normalized gradients, and normalized gradients corresponding to the detected edges can be placed in appropriate bins of a four-dimensional histogram. Any suitable edge detection technique can be employed in connection with detecting edges in the normalized gradients. The bins can be defined by edge position, orientation, and local linear length. A result of such binning, then, is a plurality of bins, wherein normalized gradients are selectively assigned to bins in the plurality of bins.

Thereafter, values can be assigned to bins based at least in part upon a number of normalized gradients assigned thereto. Thus, for instance, bins with a greater number of gradients assigned thereto can be assigned a greater value than bins with a lower number of gradients assigned thereto. In another example, a top number or threshold percentage of bins with the greatest number of normalized gradients assigned thereto can be given a first value (e.g., one) while the remaining bins can be given a second value (e.g., zero). The values assigned to the bins can be utilized as a descriptor for the image patch, and can be compared with other descriptors pertaining to other image patches for the purposes of object recognition. Alternatively, dimensionality of the descriptors can be reduced by way of a suitable compression technique, and the resultant descriptor can be utilized as the descriptor for the image patch.

Other aspects will be appreciated upon reading and understanding the attached figures and description.

DETAILED DESCRIPTION

Various technologies pertaining to performing object recognition in computer-implemented images will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
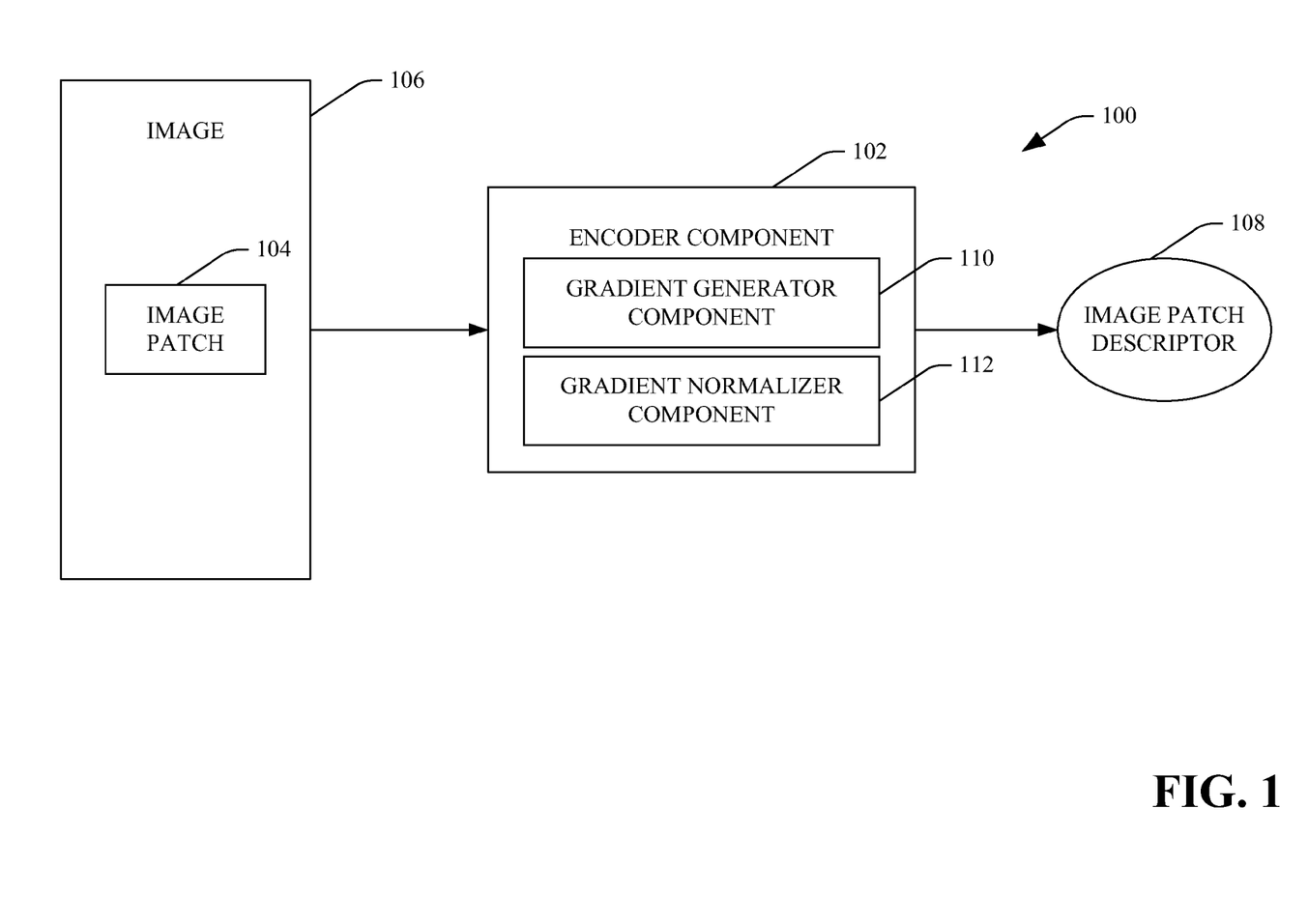
FIG. 1 is a functional block diagram of an exemplary system that facilitates generating an image patch descriptor.

With reference to FIG. 1, an exemplary system 100 that facilitates generating a descriptor for an image patch extracted from an image is illustrated. The system 100 includes an encoder component 102 that is configured to receive an image patch 104 that has been extracted from a computerized (digital) image 106. For instance, the image 106 can be retained in a data storage device such as a hard drive, a memory, a flash drive, or the like. The image patch 104, in an exemplary embodiment, can be a portion of the image 106. In another embodiment, the image patch 104 may be an entirety of the image 106. If the image patch 104 is a portion of the image 106, then the image patch 104 can be extracted from the image 106 by way of any suitable technique. For example, interest point detection can be utilized in connection with extracting the image patch 104 from the image 106, including determining the size of the image patch 104. In another example, image patches can be densely extracted from the image 106.

The encoder component 102 receives the image patch 104 and generates a descriptor 108 for the image patch 104, wherein the descriptor 108 is relatively invariant to illumination of an object in the image 106, position of the object in the image 106, and intercategory variation of the object in the image 106. Specifically, and as will be described in greater detail below, the encoder component 102 generates the descriptor 108 such that the descriptor 108 describes edges based upon orientation, position, and length of the edge in the image patch 104, but not on magnitude of the gradients in the gradient image.

The encoder component 102 can comprise a gradient generator component 110 that generates gradients with respect to pixels in the image patch 104. The image patch 104 can be a m×n pixel image patch, wherein m=n or m≠n. The intensity of a pixel p at a location $(x_p, y_p)$ in the image patch 104 can be denoted as f(p) or $f(x_p, y_p)$. The gradient generator component 110 can determine a horizontal gradient for each pixel in the image patch 104 and a vertical gradient for each pixel in the image patch 104. The horizontal gradient $f_x(p)$ of the pixel is equal to $f(x_{p+1}, y_p) - f(x_p, y_p)$, and the vertical gradient $f_y(p)$ of the pixel is equal to $f(x_p, y_{p+1}) - f(x_p, y_p)$. The gradient generator component 110 can compute the magnitude $g_p$ of the gradient for pixel p as the Euclidean norm of the horizontal and vertical gradients for pixel p: $g_p = \|[f_x(p) f_y(p)]^T\|_2$. Furthermore, the gradient generator component 110 can compute the orientation $\theta_p$ of the pixel p as follows: $\theta_p = \arctan(f_y(p)/f_x(p))$. Additionally, the gradient generator component 110 can be configured to reduce noise and sampling artifacts in gradients by applying a relatively small amount of Gaussian blur ($\sigma = 0.5$) to the image patch 104 prior to computing the gradient magnitudes and pixel orientations in the image patch 104.

The encoder component 102 further comprises a gradient normalizer component 112 that normalizes the gradients output by the gradient generator component 110. Pursuant to an example, the gradient normalizer component 112 can normalize the magnitudes of a gradient for pixel p based at least in part upon magnitudes of gradients of pixels in a local spatial neighborhood of pixel p. For instance, the local spatial neighborhood of pixel p can be defined as pixels within a predefined local area that encapsulates the pixel p, but which is less than the entirety of the image patch 104.

With more detail, the gradient normalizer component 112 is configured to normalize the gradients in such a manner as to maintain the gradient profiles while removing the relative height differences between gradient magnitude peaks. In an example, the gradient normalizer component 112 can normalize the gradients computed by the gradient generator component 110 as the average Gaussian weighted gradient magnitude as follows:

$$\bar{g}_p = \Sigma_{q \in N} g_q \mathcal{N}(q;p,\sigma_s), \qquad (1)$$

where N is a spatial neighborhood of p, $\mathcal{N}$ is a standard normal distribution, and $\sigma_s$ is a spatial standard deviation. The gradient normalizer component 112 can then compute normalized gradients $\hat{g}_p$ based at least in part upon the ratio of the original gradients and the average gradients as follows:

$$\hat{g}_p = \frac{g_p}{\max(\bar{g}_p, \epsilon)}, \qquad (2)$$

where $\epsilon$ can be set to a value (e.g., 4) to ensure that the magnitude of $\bar{g}_p$ is above a level of noise. Furthermore, the spatial standard deviation $\sigma_s$ can be empirically determined. Pursuant to an example, the spatial standard deviation $\sigma_s$ can be set to approximately 3. Furthermore, the gradient normalizer component 112, in an exemplary embodiment, can compute average gradients in three dimensions through use of the orientations discussed above.

The encoder component 102 can generate the image patch descriptor 108 based at least in part upon the normalized gradients $\hat{g}_p$ computed by the gradient normalizer component 112. The image patch descriptor 108, as will be described in greater detail herein, may thereafter be compared with other image patch descriptors to determine if two image patches across two images correspond with one another. For instance, if the image patch descriptor 108 is sufficiently similar to a second image patch descriptor corresponding to another image patch in a different image, then an indication can be output that the image 106 includes an object that is substantially similar to an object captured in the different image. In another example, if the image patch descriptor 108 is sufficiently similar to a second image patch descriptor, the image 106 can be aligned with a second image based at least in part upon the similarity between the image patch descriptors.

Figure 2:
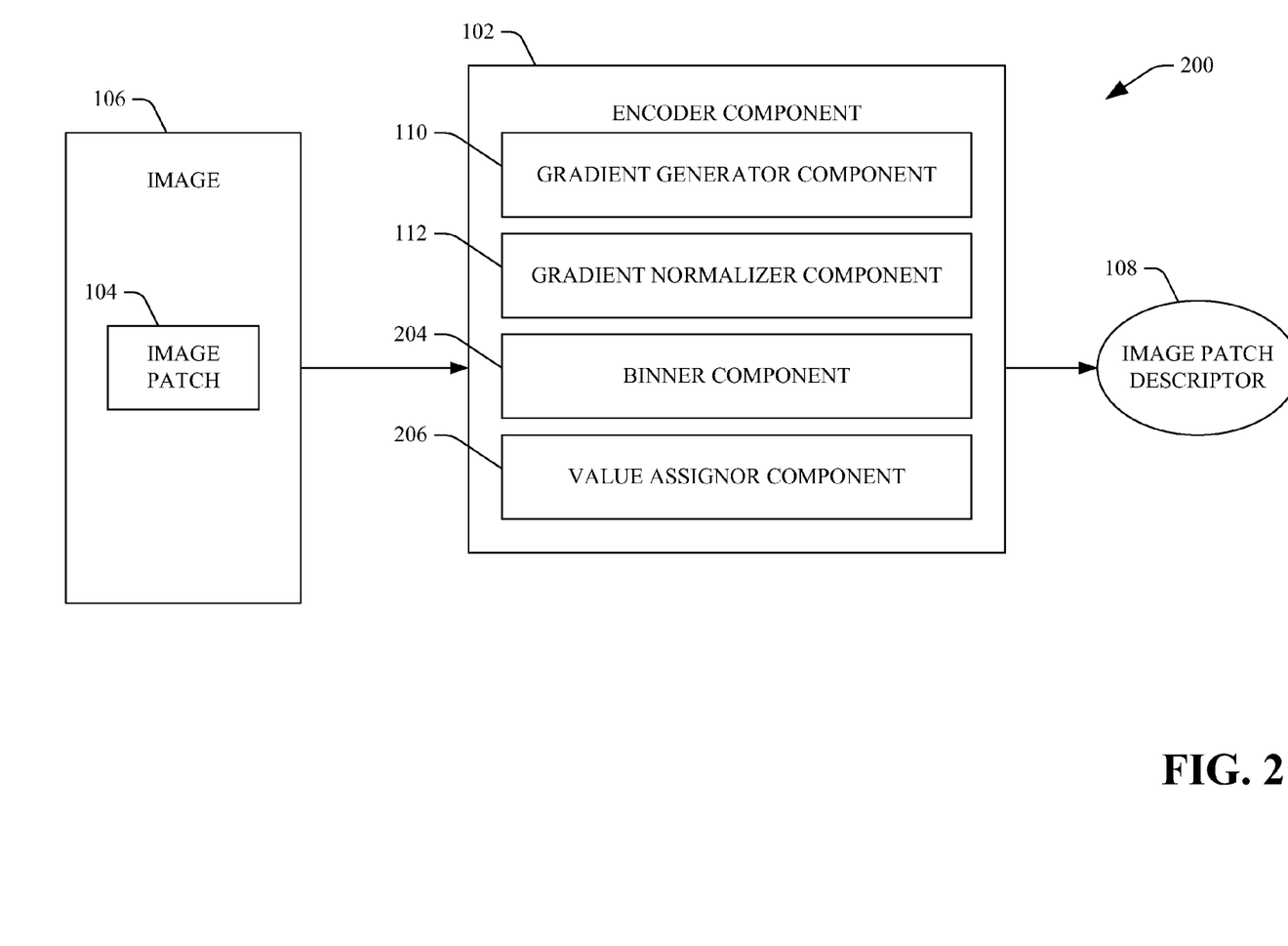
FIG. 2 is a functional block diagram of an exemplary system that facilitates generating an image patch descriptor.

Now referring to FIG. 2, an exemplary system 200 that facilitates generating a descriptor for an image patch is illustrated. The system 200 comprises the encoder component 102, which includes the gradient generator component 110 and the gradient normalizer component 112, which act as described above.

The encoder component 102 further comprises a binner component 204, which acts to aggregate normalized gradients into bins, wherein the bins are defined by positions, orientations, and local linear lengths of edges in the image patch 104. The binner component 204 can align spatial binning with an orientation of the gradient, such that the robustness of the resultant image patch descriptor 108 can vary perpendicular and parallel to an edge. Additionally, orientation-dependent sampling can be useful in connection with detecting coherent edges—e.g., sets of similarly oriented gradients aligned perpendicular to the orientation of a particular gradient.

With more specificity, the binner component 204 can define a new coordinate frame $(x'_p, y'_p)$ for each pixel p at position $(x_p, y_p)$ depending on its orientation $\theta_p$ as follows:

$$\begin{bmatrix} x'_p \\ y'_p \end{bmatrix} = R(\theta_p) \begin{bmatrix} x_p \\ y_p \end{bmatrix}, \quad (3)$$

where $R(\theta_p)$ is a standard 2D rotational matrix. For purposes of explanation, it can be assumed that the origin (0,0) is at the center of the image patch 104. Using $(x'_p, y'_p, \theta_p)$, binning can be defined on a $b_x \times b_y \times b_\theta$ resolution grid, thereby creating a histogram $H(x', y', \theta)$. The values of $b_{x'}$, $b_{y'}$ and $b_\theta$ can be determined empirically or learned through suitable training (depending on an image collection). Pursuant to a particular example, $b_{x'}$ can be equal to approximately 32, $b_{y'}$ can be equal to approximately 32, and $b_\theta$ can be equal to approximately 20. When assigning the values $\hat{g}_p$ to each bin according to $(x'_p, y'_p, \theta_p)$, the binner component 204 can utilize a standard linear soft binning approach using bilinear interpolation.

As mentioned above, orientation-dependent sampling can be useful in connection with detecting coherent edges. The binner component 204 has been described above as aggregating normalized gradients into a fixed number of bins in a three-dimensional Histogram. Specifically, the vertical dimension y' was described as being split into $b_{y'}$ bins, capturing edges $1/b_{y'}$ over the length of the image patch 104. In some instances, however, an edge can run an entire length of the image patch 104. It may be desirable to distinguish longer coherent edges from shorter texture edges. Accordingly, in an exemplary embodiment, the binner component 204 can estimate edge length $L(x', \theta)$ for an edge at position x' and orientation $\theta$ by summing vertical bins of the edge perpendicular to its gradient's direction as follows:

$$L(x',\theta) = \Sigma_{y'} H(x',y',\theta). \quad (4)$$

If a value of $l_p = L(x', \theta)$ is assigned to every normalized gradient $\hat{g}_p$, the binner component 204 can create a four-dimensional histogram $H(x', y', \theta, l)$. Further, the binner component 204 can discretize edge lengths into two bins, $b_l = 2$, which may result in separation of coherent edge gradients and short texture gradients. Specifically, the binner component 204 can compute a delta function $\Delta(l_p)$ as follows:

$$\Delta(l_p) = \max\left(0, \min\left(1, \frac{l_p - \alpha}{\beta}\right)\right), \quad (5)$$

where values of $\alpha$ and $\beta$ can be set, for instance, to 2 and 8, respectively. It is to be understood that the binner component 204 can use other sigmoid functions in connection with performing binning. Using the above, the binner component 204 can split the normalized gradient values $\hat{g}_p$ between two edge length bins using $\Delta(l_p)$ and $1-\Delta(l_p)$ as weights.

The encoder component 102 can further comprise a value assignor component 206 that assigns values to bins in the histogram based at least in part upon a number of normalized gradients assigned to such bins. For instance, the value assignor component 206 can assign a value of one to a threshold number or percentage of bins that have a greatest number of normalized gradients assigned thereto, and can assign a value of zero to other bins.

With more detail, given the 4-dimensional histogram $H(x', y', \theta, l)$ described above, it is desirable to determine edges present in the image patch 104, while providing robustness to relatively small changes in position and orientation. The value assignor component 206 can provide some robustness by applying a relatively small amount of blur to the histogram. For instance, the value assignor component 206 can apply Gaussian blurring in the x', y', and $\theta$ dimensions with standard deviations of $\sigma_{x'}$, $\sigma_{y'}$, and $\sigma_\theta$, respectively. These standard deviations can be determined empirically or learned. Pursuant to an example, $\sigma_{x'}$ can be approximately equal to one, $\sigma_{y'}$ can be approximately equal to three, and $\sigma_\theta$ can be approximately equal to one.

Prior to the value assignor component 206 assigning values to bins, resolution of the histogram can be reduced to $n_x \times n_y \times n_\theta \times n_l$ using subsampling. In an exemplary embodiment, $n_x \approx 24$, $n_y \approx 8$, $n_\theta \approx 12$, and $n_l \approx 2$ for the x', y', $\theta$, and l dimensions, respectively.

As indicated above, the value assignor component 206 can binarize the histogram's values (subsampled or non-sampled) by assigning a value of one to the top $\tau$ percent of the bins with highest values, and 0 to others. In an exemplary embodiment, $\tau \approx 20\%$. It is to be understood that any suitable selection algorithm can be employed in connection with selecting a value for $\tau$. To reduce bias in the detection of longer edges over texture edges, binarization can be performed independently for both sets of edge length bins. The resulting image patch descriptor 108 can be denoted as D.

In an example, the dimensionality of the image patch descriptor 108 can be relatively high, thereby causing comparison of the image patch descriptor 108 with other descriptors to be computationally expensive. Accordingly, the encoder component 102 can be configured to reduce dimensionality of the image patch descriptor 108. One exemplary approach for reducing dimensionality of the image patch descriptor 108 is Principal Component Analysis (PCA). In an example, the encoder component 102 can perform PCA using a standard approach to compute K basis vectors. A suitable training dataset can be utilized to learn basis functions. Using real-valued descriptors, the cost of projecting an M dimensional descriptor using K basis functions uses MK multiplications and additions, which can be computationally expensive for large descriptors.

To increase efficiency, two properties of the image patch descriptor 108 can be taken advantage of: the binary nature of the image patch descriptor 108 and neighboring values typically having the same values. Accordingly, a technique similar to integral images can be used to efficiently project descriptors by pre-computing the following values:

$$w_{k,i}^\Sigma = \Sigma_{j<i} w_{k,j}, \quad (6)$$

where $w_{k,i}$ is the ith value in the kth basis vector. Thus, $w_{k,i}^\Sigma$ is the sum of all values in $w_k$ before the ith entry. To compute the reduced dimensional descriptor D* the kth projection of D can be computed as follows:

$$D_k^* = \Sigma_i (D_{i-1} - D_i) w_{k,i}^\Sigma. \quad (7)$$

Since $(D_{i-1} - D_i)$ is only nonzero when neighboring values aren't equal, the total amount of computation is greatly reduced. To handle boundary conditions, an additional entry can be added to the end of all descriptors with a value of zero.

Figure 3:
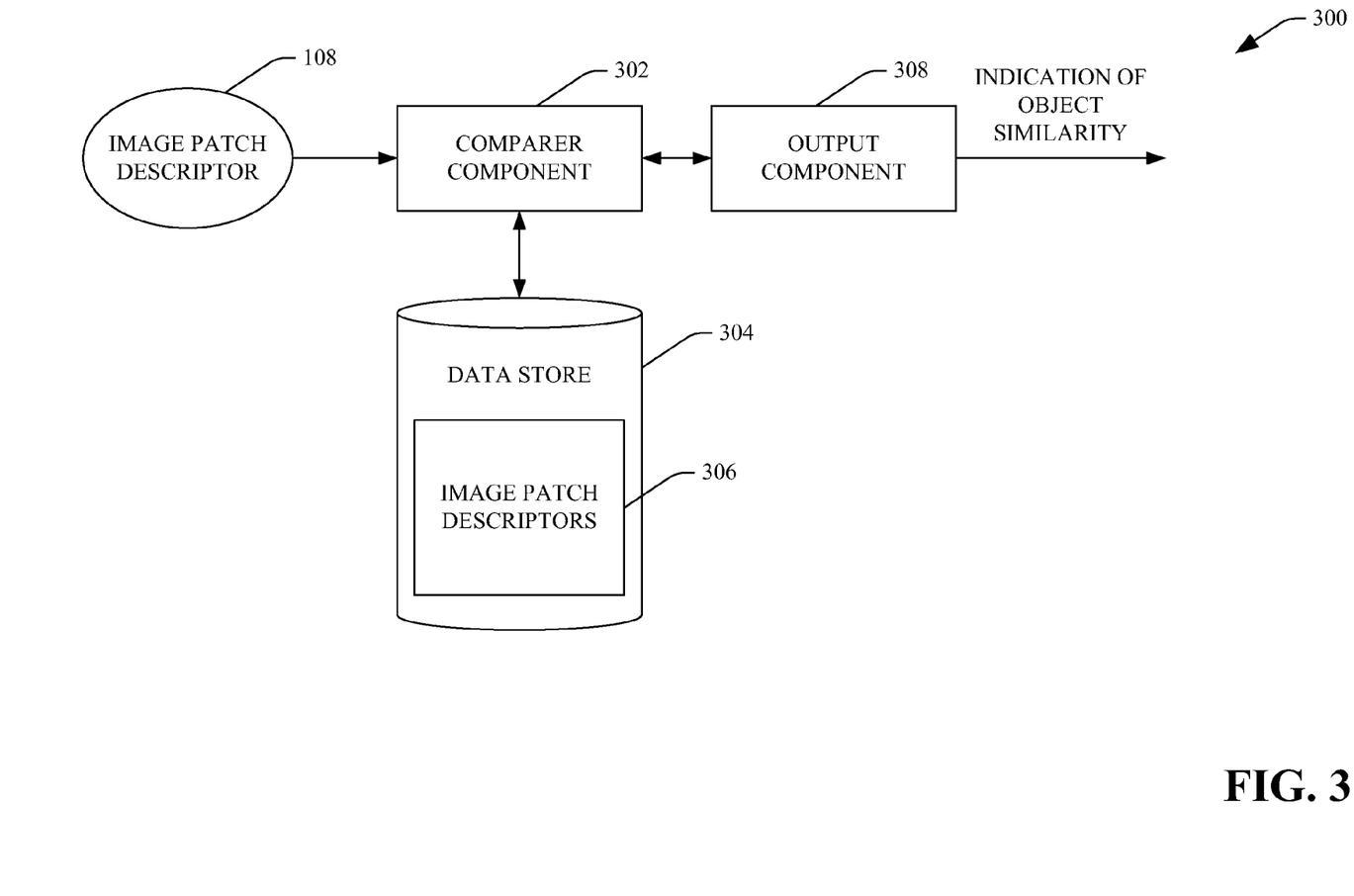
FIG. 3 is a functional block diagram of an exemplary system that facilitates performing object recognition in images.

Now referring to FIG. 3, an exemplary system 300 that facilitates performing object recognition in images based at least in part upon a comparison between image patch descriptors is illustrated. Above, creation of the image patch descriptor 108 has been described. The system 300 comprises a comparer component 302 that receives the image patch descriptor 108 (with original or reduced dimensionality). The system 300 further comprises a data store 304 that retains a plurality of image patch descriptors 306 that corresponds to a plurality of digital images. The comparer component 302 receives the image patch descriptor 108 and accesses the data store 304 to receive one or more of the image patch descriptors 306. The comparer component 302 compares the image patch descriptor 108 with at least one of the plurality of image patch descriptors 306 to determine similarity therebetween. For instance, the comparer component 302 can search the plurality of image patch descriptors 306 for one or more descriptors that is/are sufficiently similar to the image patch descriptor 108.

An output component 308 is in communication with the comparer component 302, and can output an indication that two images include substantially similar objects based at least in part upon a comparison undertaken by the comparer component 302. This indication can be transmitted to a display screen of a computing device such that an individual can be provided with additional information pertaining to an object. In another example, this indication can be transmitted to a data store and utilized to index one or more images corresponding to the image patch descriptors.

Pursuant to a particular example, the comparer component 302 can utilize min-hash in connection with locating one or more descriptors that are similar to the image patch descriptor 108. Min-hash is described in Broder, A.Z.: "On the Resemblance and Containment of Documents," In Compression and Complexity of Sequences, IEEE Computer Society (1997), 21-29, the entirety of which is incorporated herein by reference. Hashing techniques used in conjunction with inverse look-up tables can provide a fast and scalable method for finding similar points in high dimensional spaces with certain probabilistic guarantees. In particular, the min-hash technique has the property that the probability of two hashes being identical is equal to the Jaccard similarity. The Jaccard similarity is the cardinality of the intersection of two sets divided by their union's cardinality. In an example, the elements of the set are the indices assigned to one by the image patch descriptor 108. The comparer component 302 can locate a min-hash by creating a random permutation of the set of possible indices. The smallest permuted index with a value of one in a descriptor is its resulting hash value. Multiple hashes can be generated for a single descriptor using different random permutations. Given a set of descriptors with hashes, an inverse lookup table can be created to efficiently find descriptors with equal hash values. If enough hashes are shared between two descriptors, they are said to "match".

In order to increase a uniqueness of a hash, hashes can be concatenated into sketches. The size of the sketch refers to the number of hashes used to create it. If the Jaccard similarity between two patches f and f' is J(f, f'), the probability of two sketches being identical is $J(f, f')^k$, where k is the sketch size. Min-hash is increasingly effective if the Jaccard similarity between matching images is high and is low for non-matches.

Figure 4:
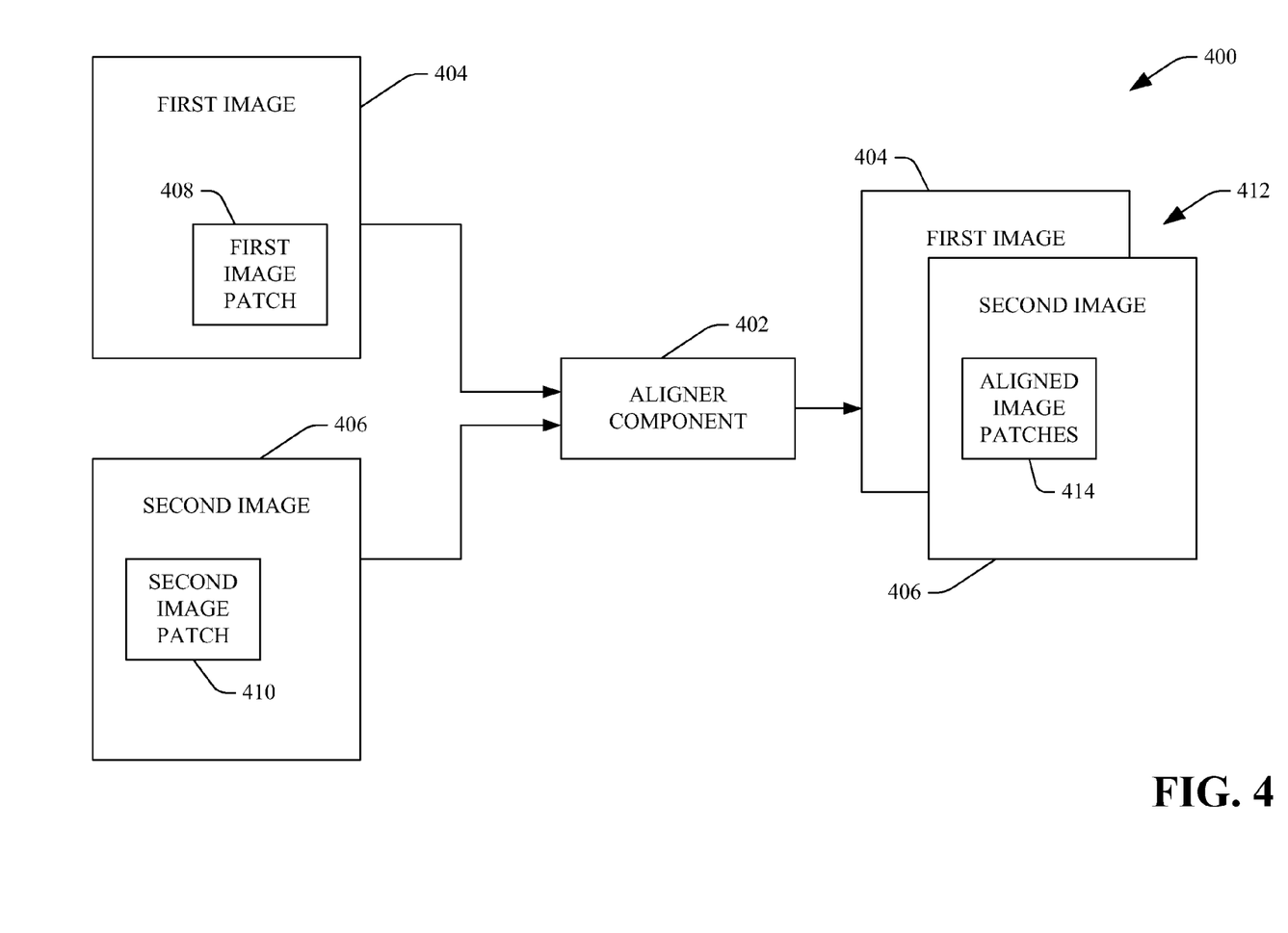
FIG. 4 is a functional block diagram of an exemplary system that facilitates aligning images based at least in part upon a comparison of image patch descriptors.

Now referring to FIG. 4, an exemplary system 400 that facilitates aligning two images based at least in part upon comparison of image patch descriptors corresponding to the two images is illustrated. The system 400 includes an aligner component 402 that receives a first image 404 and a second image 406. The first image 404 includes a first image patch 408, and the second image 406 includes a second image patch 410. Pursuant to an example, the first image patch 408 and the second image patch 410 can have image patch descriptors corresponding thereto, wherein the image patch descriptors were generated as described above. The comparer component 302 (FIG. 3) can compare the image patch descriptors and can ascertain that the image patch descriptors correspond to one another, and thus that the first image patch 408 and the second image patch 410 correspond to one another (and thus the first image 404 corresponds to the second image 406). That is, the first image 404 and the second image 406 include a substantially similar object, and the first image patch 408 and the second image patch 410 can capture corresponding portions of the object. That aligner component 402 may then align the first image 404 and the second image 406 by aligning the first image patch 408 and the second image patch 410 across the first and second images 404 and 406, resulting in aligned images 412 aligned in accordance with aligned image patches 414.

Pursuant to an example, the aligned images 412 can create a three-dimensional model of an object captured in the first image 404 and the second image 406. Thus, the first image 404 and the second image 406 may be images of a same object or event at different orientations, and the aligner component 402 can align such images 404 and 406 based at least in part upon a comparison between image patch descriptors corresponding to the first image 404 and the second image 406.

Figure 5:
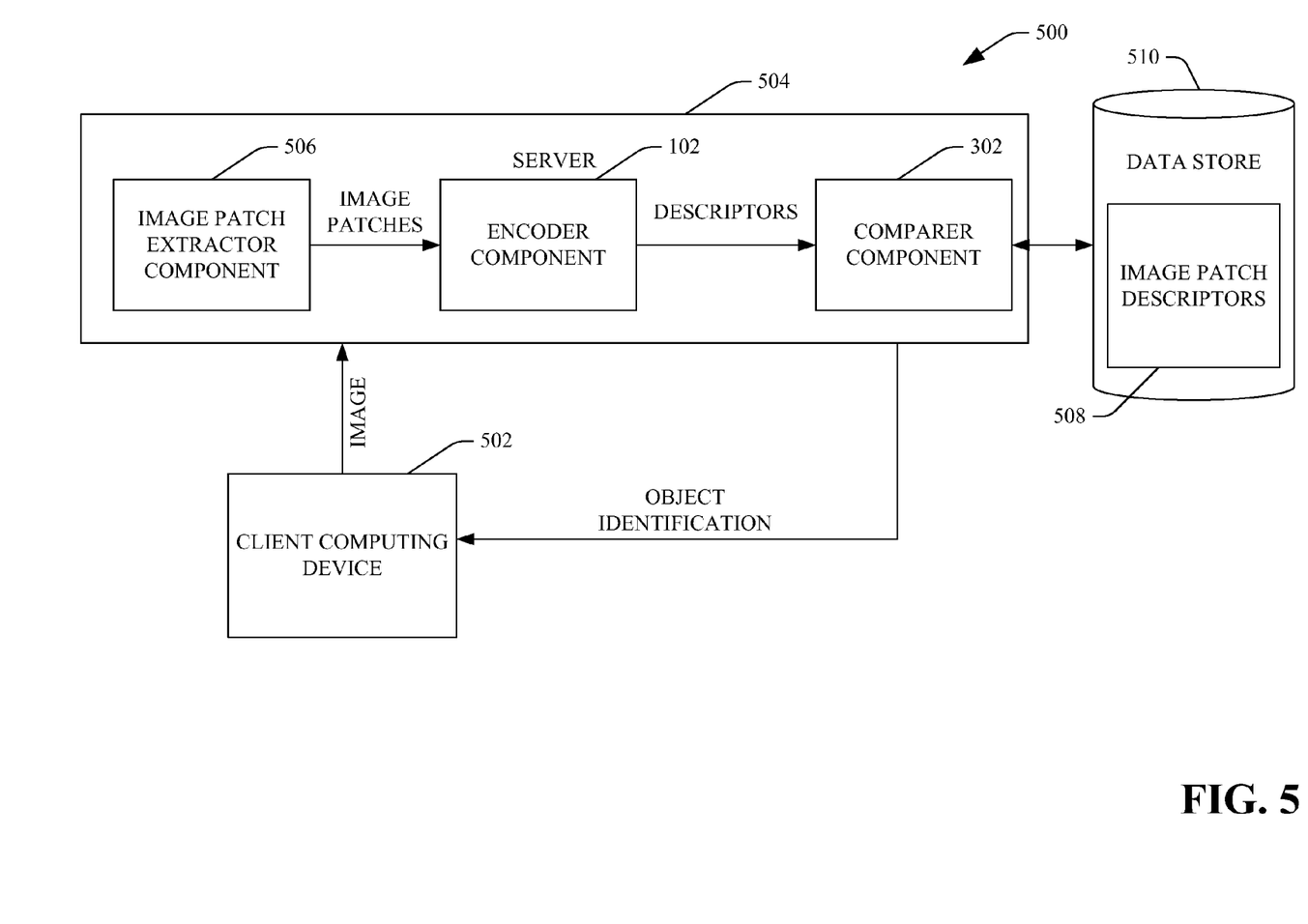
FIG. 5 is a functional block diagram of an exemplary system that facilitates performing object recognition with respect to an object captured in a digital image.

Now referring to FIG. 5, an exemplary system 500 that facilitates performing automatic object recognition is illustrated. The system 500 comprises a client computing device 502 and a server computing device 504 that are in communication with one another by way of a network connection. In an example, the client computing device 502 can be a mobile computing device with a built-in digital camera, such that digital images can be captured using the mobile computing device 502 and transmitted to the server component device 504. In another example, the client computing device 502 may be a desktop or laptop computer that can retain digital images thereon, and can transmit one or more digital images to the server computing device 504 upon receipt of commands from a user thereof.

The server computing device 504 can receive a digital image from the client computing device 502 by way of a network connection. The server computing device 504 comprises an image patch extractor component 506 that can extract image patches from the image received from the client computing device 502. Such patches can be selectively extracted based at least in part upon detected interest points in the digital image. In another example, the image patch extractor component 506 can densely extract image patches from the image.

The server computing device 504 further comprises the encoder component 102, which can generate image patch descriptors for each of the image patches extracted by the image patch extractor component 506. As described above, the image patch descriptors can be created by normalizing gradient magnitudes corresponding to pixels in the image patches, selectively binning normalized gradients in a four-dimensional histogram, and assigning values to bins of the histogram based at least in part upon a number of normalized gradients assigned to the bins.

The comparer component 302 can receive the image patch descriptors corresponding to the image transmitted to the server computing device 504 by the client computing device 502, and can search a plurality of image patch descriptors 508 resident in a data store 510 that is accessible to the comparer component 302. The comparer component 302 can locate one or more image patch descriptors 508 in the image patch descriptors 508 that are sufficiently similar to one or more of the image patch descriptors corresponding to the image transmitted to the server computing device 504 from the client computing device 502. Location of a similar image patch descriptor indicates that an object in an image corresponding to the located image patch descriptor is substantially similar to an object captured in the digital image transmitted to the server computing device 504 by the client computing device 502. The server computing device 504 can output an indication to the client computing device 502 that the object has been identified. Pursuant to an example, the server computing device 504 can output additional information pertaining to the object recognized in the image, including additional photographs, location information, historical data pertaining to the recognized object, etc.

Figure 6:
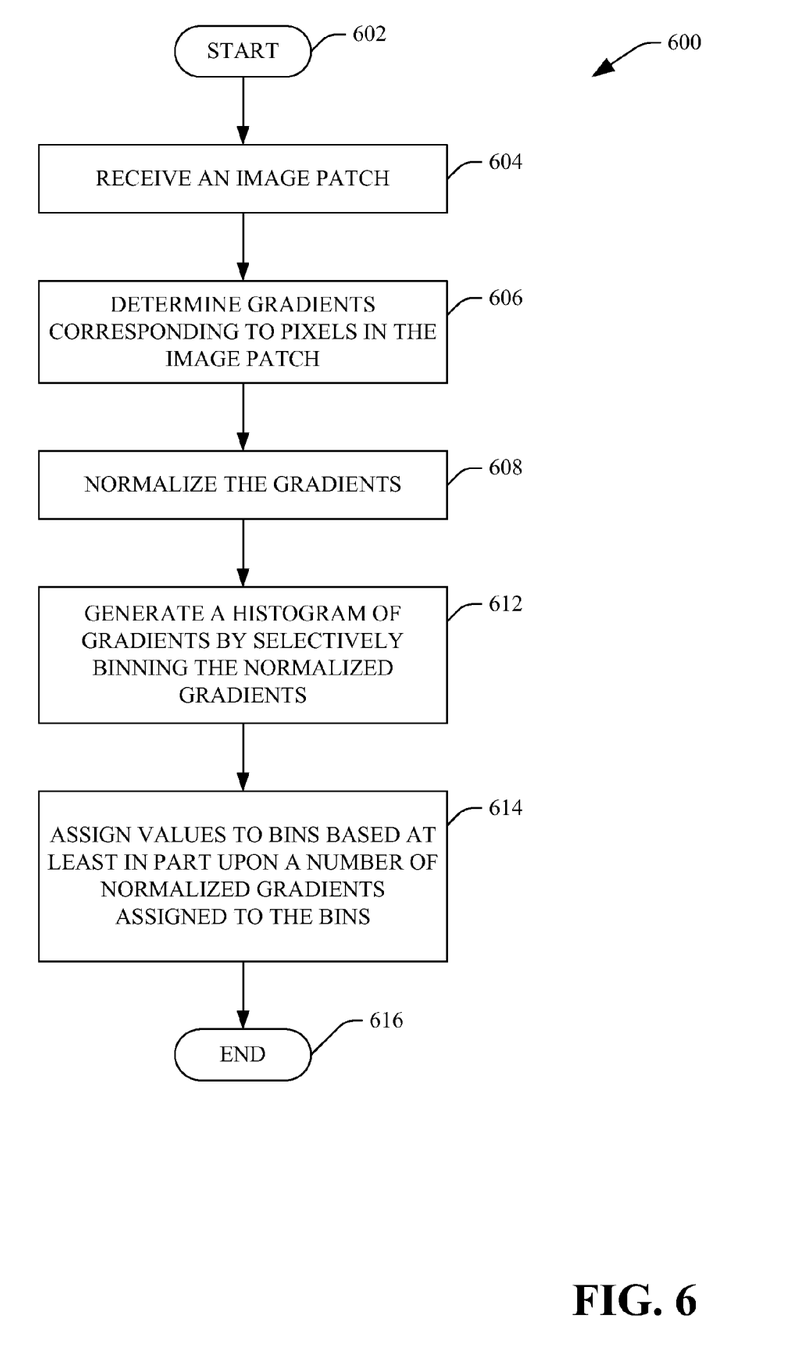
FIG. 6 is flow diagram that illustrates an exemplary methodology for generating a descriptor for an image patch.
Figure 7:
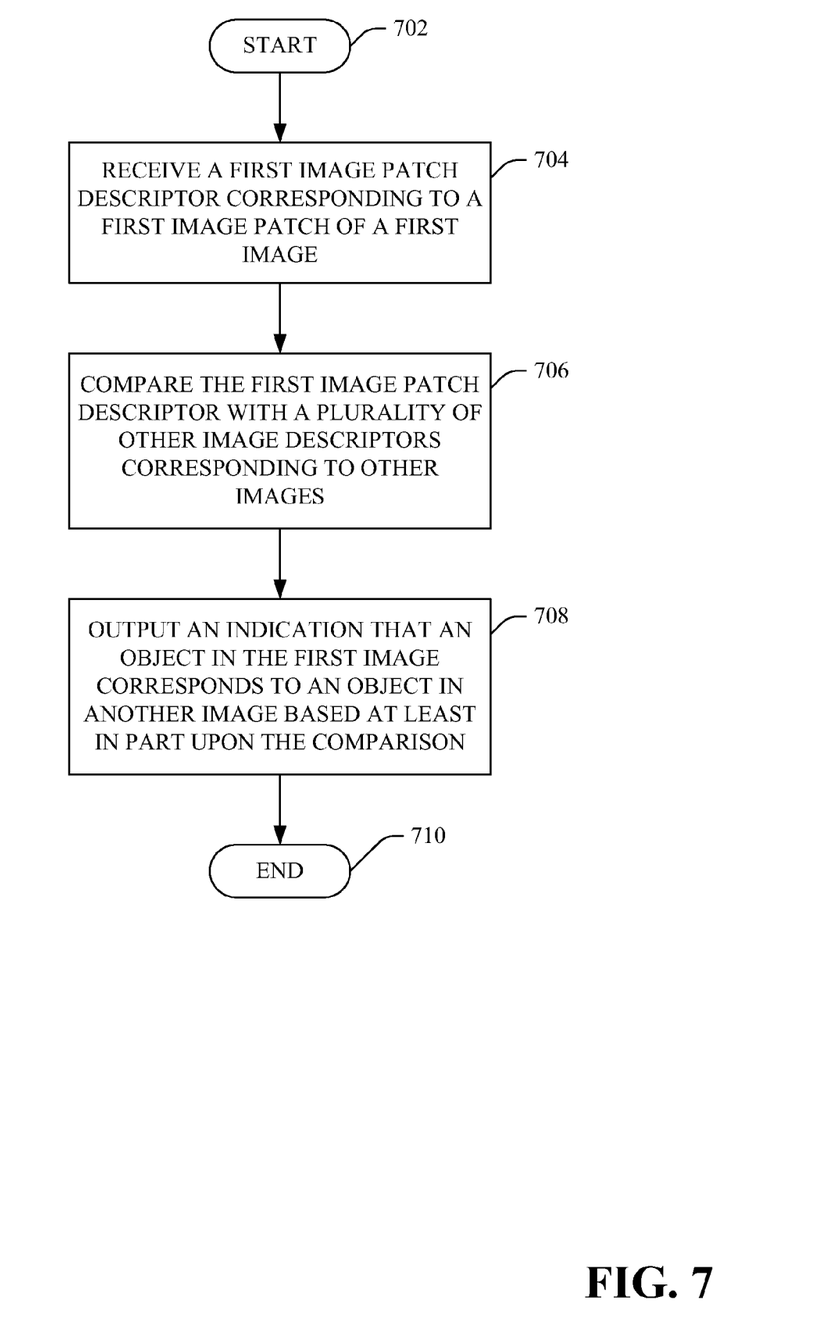
FIG. 7 is a flow diagram that illustrates an exemplary methodology performing object recognition based at least in part upon a descriptor for an image patch.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, a methodology 600 that facilitates generating a descriptor for an image patch is illustrated. The methodology 600 begins at 602, and at 604 an image patch is received, wherein the image patch is a portion of an image. At 606, gradients corresponding to pixels in the image patch are determined. At 608, the gradients or normalized based at least in part upon an average magnitude of gradients in a local spatial neighborhood to a given pixel under consideration.

At 612, a four-dimensional histogram of gradients is generated by selectively binning the normalized gradients. At 614, values are assigned to bins in the histogram based at least in part upon a number of normalized gradients assigned to such bins. In an example, the values assigned to the bins can be one or zero. The methodology 600 completes at 616.

Now referring to FIG. 7, an exemplary methodology 700 that facilitates performing object recognition in connection with a digital image is illustrated. The methodology 700 begins at 702, and at 704 a first image patch descriptor that corresponds to a first image patch of a first image is received. At 706, the first image patch descriptor is compared with a plurality of other image patch descriptors corresponding to other images. At 708, an indication that an object in the first image corresponds (e.g., is substantially similar) to an object in another image is output based at least in part upon the comparison undertaken at 706. The methodology 700 completes at 710.

Figure 8:
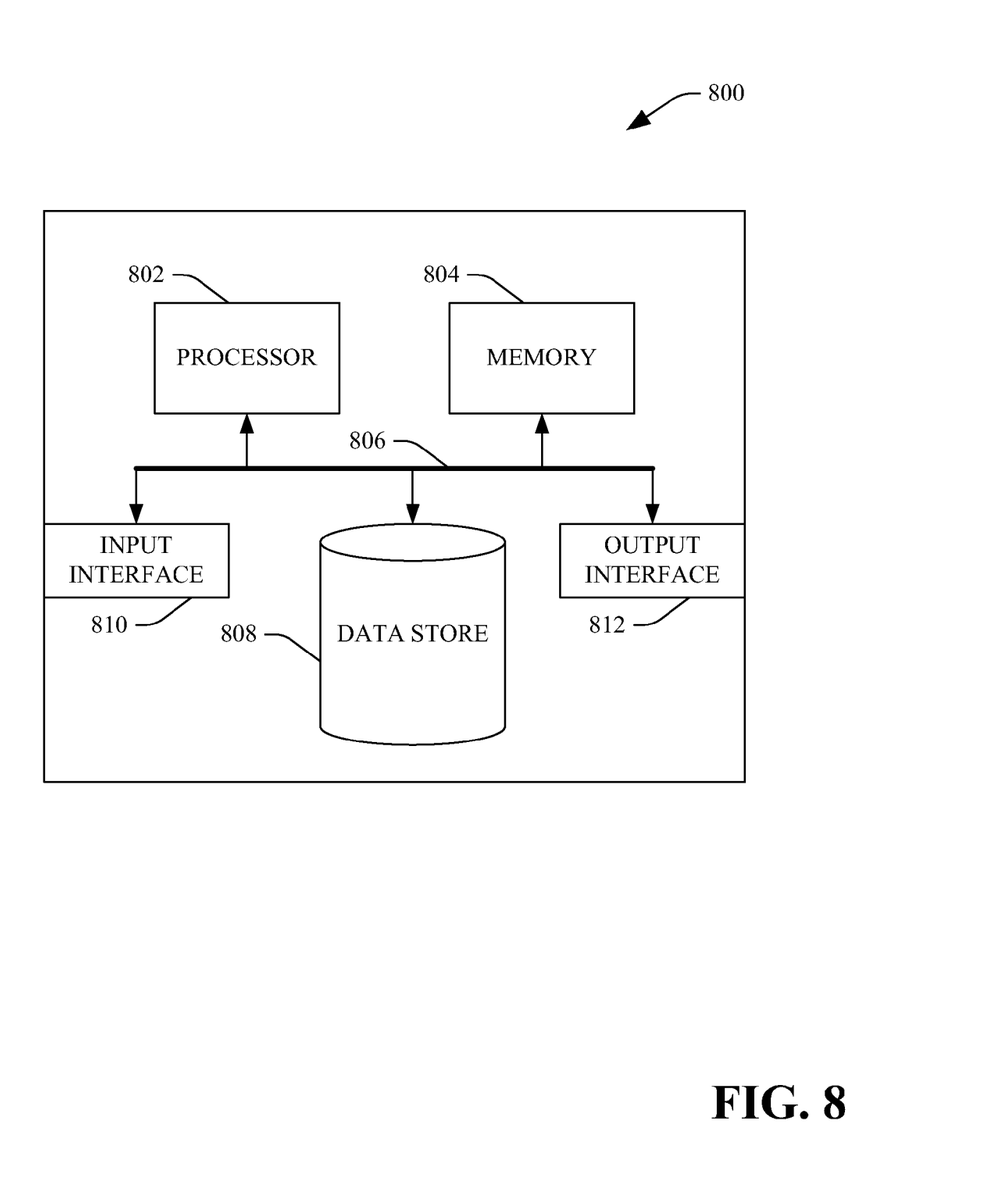
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports generating image patch descriptors. In another example, at least a portion of the computing device 800 may be used in a system that supports performing object recognition in digital images. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store images, descriptors, image patches, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, images, descriptors, image patches, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising a plurality of acts that are executed by a processor, the acts comprising:
    encoding a first descriptor for a first image patch, wherein the first image patch is a portion of a first digital image, and wherein encoding the first descriptor for the first image patch comprises normalizing a magnitude of a gradient corresponding to an edge in the first image patch, wherein normalizing the gradient comprises normalizing the gradient based at least in part upon an average gradient magnitude in a spatial neighborhood that is within a threshold number of pixels from a pixel corresponding to the gradient;
    comparing the first descriptor for the first image patch with a second descriptor for a second image patch, wherein the second image patch is a portion of a second image; and
    outputting an indication that the first digital image and the second digital image comprise a substantially similar object based at least in part upon the comparing of the first descriptor for the first image patch with the second descriptor for the second image patch.

2. The method of claim 1, wherein a server is configured to execute the method responsive to receiving an image from a mobile computing device of a user.

3. The method of claim 1, wherein the first image patch comprises a plurality of edges, wherein the plurality of edges correspond to a plurality of gradients, and wherein encoding the first descriptor for the first image patch further comprises selectively binning the plurality of gradients into a plurality of bins based at least in part upon corresponding positions, orientations, and linear lengths of the plurality of edges.

4. The method of claim 3, wherein encoding the first descriptor for the first image patch further comprises assigning values to each of the bins based at least in part upon a number of gradients included in each of the bins.

5. The method of claim 4, wherein the values assigned to each of the bins are either one or zero.

6. The method of claim 5, wherein a one is assigned to each bin that is in a top threshold percentage of bins with respect to a number of gradients retained therein.

7. The method of claim 1, further comprising aligning the first digital image with the second digital image based at least in part upon the comparing of the first descriptor for the first image patch with the second descriptor for the second image patch.

8. The method of claim 1, further comprising:
receiving, by way of a network connection, the first image from a user;
comparing the first descriptor with descriptors that correspond to a plurality of different images, wherein the plurality of descriptors are retained in a data repository; and
locating the second image based at least in part upon the comparing of the first descriptor with descriptors that correspond to the plurality of different images.

9. The method of claim 1, further comprising reducing dimensionality of the first descriptor prior to comparing the first descriptor with the second descriptor.

10. The method of claim 9, wherein Principal Component Analysis is utilized to reduce the dimensionality of the first descriptor, and wherein min-hash is utilized in connection with comparing the first descriptor with the second descriptor.

11. A system, comprising:
a processor; and
a memory that comprises a plurality of components that are executable by the processor, the plurality of components comprising:
an encoder component that encodes a descriptor for an image patch, the encoder component comprising:
a gradient generator component that generates gradients corresponding to pixels in the image patch, wherein each pixel in the image patch has a respective gradient corresponding thereto; and
a gradient normalizer component that normalizes the plurality of gradients to generate a respective plurality of normalized gradients, wherein for each gradient in the plurality of gradients, the gradient normalizer component normalizes a respective gradient based at least in part upon an average magnitude of gradients in a local spatial neighborhood of a pixel for which the respective gradient has been generated by the gradient generator component, the local spatial neighborhood being a defined number of pixels from the pixel, and wherein the encoder component encodes the descriptor for the image patch based at least in part upon the normalized gradients.

12. The system of claim 11, wherein the gradient normalizer component computes a normalized gradient map by way of the following algorithm:

$$\hat{g}_p = \frac{g_p}{\max(\bar{g}_p, \epsilon)},$$

where $g_p$ is a gradient magnitude for a pixel p, $\bar{g}_p$ is an average Gaussian weighted gradient magnitude over a local spatial neighborhood corresponding to the pixel p, and $\epsilon$ is a constant.

13. The system of claim 11 comprised by a server, wherein the encoder component encodes the descriptor for the image patch responsive to a user transmitting an image to the server.

14. The system of claim 11, wherein the encoder component further comprises:
an edge detector component that detects a plurality of edges in the image patch through analysis of the normalized gradients; and
a binner component that selectively assigns each normalized gradient in the plurality of normalized gradients into a respective bin from amongst a plurality of bins based at least in part upon position, orientation, and local linear length of edges that correspond to a respective normalized gradient.

15. The system of claim 14, wherein the encoder component further comprises a value assignor component that assigns a binary value to each bin in the plurality of bins based at least in part upon a number of normalized gradients assigned to a respective bin.

16. The system of claim 11, wherein the components further comprise a comparer component that compares the descriptor with another descriptor corresponding to a different image patch from a separate image.

17. The system of claim 16, wherein the components further comprise an output component that outputs an indication that an object in the image corresponds to an object in the separate image based at least in part upon a comparison undertaken by the comparer component.

18. The system of claim 17, wherein the components further comprise an aligner component that aligns the image with the separate image based at least in part upon a comparison undertaken by the comparer component.

19. The system of claim 17 comprised by a server that is accessible by way of a network, wherein the encoder component receives the image from a user that uploads the image to the server.

20. A computing device comprising a computer-readable storage device, the computer-readable storage device comprising instructions that, when executed by a processor, cause the processor to perform acts comprising:
receiving an image patch, wherein the image patch is a portion of a digital image;
generating a descriptor for the image patch, wherein generating the descriptor comprises:
determining, for each pixel in the image patch, a respective gradient, thereby determining a plurality of gradients;
normalizing each gradient in the plurality of gradients to generate normalized gradients, wherein the normalizing of a respective gradient corresponding to a pixel in the digital image comprises normalizing the respective gradient based upon an average magnitude of gradients corresponding to pixels in a spatial neighborhood of the pixel, the spatial neighborhood defined by a threshold;
analyzing the normalized gradients to detect edges in the image patch;

selectively binning each normalized gradient in the normalized gradients into a respective bin based at least in part upon the analyzing of a respective normalized gradient; and assigning a respective value to each bin based at least in part upon a number of normalized gradients assigned to a respective bin.

\* \* \* \* \*